United States Patent
Mossoba et al.

(10) Patent No.: US 12,073,839 B2
(45) Date of Patent: Aug. 27, 2024

(54) AUTHENTICATION BY SPEECH AT A MACHINE

(71) Applicant: Capital One Services, LLC, McLean, VA (US)

(72) Inventors: Michael Mossoba, Great Falls, VA (US); Joshua Edwards, Philadelphia, PA (US); Abdelkader M'Hamed Benkreira, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 254 days.

(21) Appl. No.: 17/656,294

(22) Filed: Mar. 24, 2022

(65) Prior Publication Data

US 2023/0306970 A1    Sep. 28, 2023

(51) Int. Cl.
*G10L 17/22* (2013.01)
*G06F 21/32* (2013.01)
*G10L 17/14* (2013.01)

(52) U.S. Cl.
CPC ............ *G10L 17/22* (2013.01); *G06F 21/32* (2013.01); *G10L 17/14* (2013.01)

(58) Field of Classification Search
CPC .......... G06F 3/167; G06F 18/25; G06F 21/32; G06F 21/36; G06F 40/289; G06F 3/016; G06F 3/017; G06F 11/1469; G06F 21/316; G06F 21/33; G06F 21/34; G06F 21/40; G06F 21/6218; G06F 21/6245; G06F 40/174; G06Q 10/0833; G06Q 20/40145; G06V 40/172; G06V 40/45; G06V 40/67; G10L 17/02; G10L 17/04; G10L 17/14; G10L 17/22; G10L 17/24; G10L 19/018; G10L 17/06; H04L 9/3231; H04L 9/3268; H04L 63/0861; H04L 63/10; H04L 63/0853; H04L 63/0876; G06K 19/07701; G07C 9/257; G07C 9/37; G16B 50/00; H04N 21/2547; H04N 21/4223; H04N 23/611; H04W 4/21
See application file for complete search history.

(56) References Cited

U.S. PATENT DOCUMENTS 6,175,626 B1 *  1/2001  Aucsmith ............... G06F 21/33
                                            380/30
7,281,133 B2 * 10/2007  Ginter ................ H04N 21/2547
                                            713/181
(Continued)

FOREIGN PATENT DOCUMENTS

KR    20180016232 A    2/2018

*Primary Examiner* — Gerald Gauthier
(74) *Attorney, Agent, or Firm* — Harrity & Harrity, LLP

(57) ABSTRACT

In some implementations, a front-end device may receive a physical identifier associated with the user. Accordingly, the front-end device may select a plurality of images, where each image corresponds to a unique integer of integers zero through nine. The front-end device may show, on a display, the plurality of images and receive audio that includes a sequence of words that describe a subset of the plurality of images. Accordingly, the front-end device may map the sequence of words to the subset of the plurality of images and determine a first sequence of numbers corresponding to the subset of the plurality of images. Therefore, the front-end device may authenticate the user based on the first sequence of numbers matching a second sequence of numbers associated with the user.

20 Claims, 11 Drawing Sheets

(56) References Cited

U.S. PATENT DOCUMENTS

| | | | |
|---|---|---|---|
| 9,286,899 B1* | 3/2016 | Narayanan | G06F 21/32 |
| 9,898,619 B1* | 2/2018 | Hadsall | G06F 21/6245 |
| 9,953,231 B1* | 4/2018 | Medina, III | G06V 40/45 |
| 10,051,131 B2 | 8/2018 | Saylor et al. | |
| 10,178,432 B2* | 1/2019 | Richman | H04N 21/4223 |
| 10,438,582 B1* | 10/2019 | VanLund | G10L 17/22 |
| 10,803,859 B1* | 10/2020 | Williams | G10L 17/06 |
| 10,848,482 B1* | 11/2020 | Eisen | G06F 40/289 |
| 10,911,425 B1* | 2/2021 | Hitchcock | G06F 21/34 |
| 11,128,636 B1* | 9/2021 | Jorasch | G07C 9/257 |
| 11,182,121 B2 | 11/2021 | Barnes, Jr. | |
| 11,222,103 B1* | 1/2022 | Gallopyn | G10L 17/22 |
| 11,227,036 B1* | 1/2022 | Hitchcock | G06F 21/40 |
| 11,233,788 B1* | 1/2022 | Hitchcock | G06F 21/32 |
| 11,494,472 B2* | 11/2022 | Jhawar | G10L 17/04 |
| 11,722,571 B1* | 8/2023 | Chenier | G10L 17/22 709/224 |
| 2012/0232978 A1* | 9/2012 | Steul | H04W 4/21 455/413 |
| 2012/0254992 A1* | 10/2012 | Levien | G06F 21/6218 726/21 |
| 2014/0020089 A1* | 1/2014 | Perini | G07C 9/37 726/19 |
| 2014/0074696 A1* | 3/2014 | Glaser | G06F 21/32 726/19 |
| 2014/0081665 A1* | 3/2014 | Holmes | G06F 21/32 705/3 |
| 2014/0183269 A1* | 7/2014 | Glaser | G06K 19/07701 235/492 |
| 2014/0189850 A1* | 7/2014 | Marshall | G06F 21/316 726/17 |
| 2014/0215586 A1* | 7/2014 | Tilton | G06F 21/34 726/6 |
| 2015/0161375 A1* | 6/2015 | Ghosh | G06F 21/36 726/7 |
| 2015/0347734 A1* | 12/2015 | Beigi | H04L 9/3268 726/28 |
| 2016/0072800 A1* | 3/2016 | Soon-Shiong | G16B 50/00 726/7 |
| 2016/0088473 A1* | 3/2016 | Feher | H04L 63/0876 455/411 |
| 2016/0283708 A1* | 9/2016 | Getchius | G06F 21/36 |
| 2016/0315942 A1* | 10/2016 | Liu | G06F 21/32 |
| 2017/0103397 A1* | 4/2017 | Chiu | G10L 17/24 |
| 2017/0235955 A1* | 8/2017 | Barkan | H04L 63/0853 726/11 |
| 2018/0089412 A1* | 3/2018 | Kopikare | G06F 40/174 |
| 2018/0129795 A1* | 5/2018 | Katz-Oz | H04L 63/10 |
| 2018/0146370 A1* | 5/2018 | Krishnaswamy | G10L 19/018 |
| 2018/0174591 A1* | 6/2018 | Kurian | G10L 17/02 |
| 2019/0020481 A1* | 1/2019 | Agrawal | H04L 9/3231 |
| 2019/0068599 A1* | 2/2019 | Jakubzak | H04L 63/0861 |
| 2019/0080072 A1* | 3/2019 | Van Os | G06F 3/016 |
| 2019/0080189 A1* | 3/2019 | Van Os | H04N 23/611 |
| 2019/0164156 A1 | 5/2019 | Lindemann | |
| 2019/0347440 A1* | 11/2019 | Langley | G06F 11/1469 |
| 2019/0370448 A1* | 12/2019 | Devine | G06V 40/67 |
| 2019/0370549 A1* | 12/2019 | Lai | G06F 3/017 |
| 2020/0389451 A1* | 12/2020 | Nair | H04L 63/0861 |
| 2021/0089640 A1* | 3/2021 | DeRosa-Grund | G06F 18/25 |
| 2021/0150469 A1* | 5/2021 | Miller | G06Q 10/0833 |
| 2021/0342020 A1* | 11/2021 | Jorasch | G06F 3/016 |
| 2022/0029981 A1* | 1/2022 | Mavani | G06F 3/167 |
| 2022/0050498 A1* | 2/2022 | Wexler | G06V 40/172 |
| 2022/0237274 A1* | 7/2022 | Paul | G06F 21/32 |
| 2022/0328050 A1* | 10/2022 | Hennig | G10L 17/24 |
| 2022/0342972 A1* | 10/2022 | Van Os | G06V 40/172 |
| 2022/0383319 A1* | 12/2022 | Ach, II | G06Q 20/40145 |
| 2022/0391867 A1* | 12/2022 | Glaser | G06F 3/017 |
| 2023/0019250 A1* | 1/2023 | Lee | G06F 21/32 |
| 2023/0306970 A1* | 9/2023 | Mossoba | G06F 21/32 |

* cited by examiner

AUTHENTICATION BY SPEECH AT A MACHINE

BACKGROUND

Many machines authenticate a user by requesting input of a numerical code associated with the user, such as a personal identifier number (PIN), along with presentation of a physical identifier associated with the user, such as a card. However, these machines are vulnerable to card skimmers and low-quality cameras that can be used to copy the physical identifier and obtain the numerical code, respectively.

SUMMARY

Some implementations described herein relate to a system for authenticating a user by speech. The system may include one or more memories and one or more processors communicatively coupled to the one or more memories. The one or more processors may be configured to receive, at a front-end device, a physical identifier associated with the user. The one or more processors may be configured to select, at the front-end device, a plurality of images corresponding to integers zero through nine, wherein each image has a property that indicates the corresponding integer for the image. The one or more processors may be further configured to receive audio that includes a sequence of words that describe a subset of the plurality of images. The one or more processors may be configured to map the sequence of words to the subset of the plurality of images. The one or more processors may be further configured to determine a first sequence of numbers corresponding to the subset of the plurality of images. The one or more processors may be configured to authenticate the user based on the first sequence of numbers matching a second sequence of numbers associated with the user.

Some implementations described herein relate to a method of authenticating a user by speech. The method may include receiving, at a front-end device, a physical identifier associated with the user. The method may include selecting, at the front-end device, a plurality of images, wherein each image corresponds to a unique integer of integers zero through nine. The method may further include showing, on a display of the front-end device, the plurality of images in association with the corresponding integers. The method may include receiving audio that includes a sequence of words that describe a subset of the plurality of images. The method may further include mapping the sequence of words to the subset of the plurality of images. The method may include determining a first sequence of numbers corresponding to the subset of the plurality of images. The method may further include authenticating the user based on the first sequence of numbers matching a second sequence of numbers associated with the user.

Some implementations described herein relate to a non-transitory computer-readable medium that stores a set of instructions for authenticating a user by speech for a device. The set of instructions, when executed by one or more processors of the device, may cause the device to receive, from a user device, a request for an identifier associated with the user of the user device. The set of instructions, when executed by one or more processors of the device, may further cause the device to indicate, to the user device, a sequence of objects based on a generated identifier associated with the user. The set of instructions, when executed by one or more processors of the device, may cause the device to receive, from a front-end device, a request to authenticate the user. The set of instructions, when executed by one or more processors of the device, may further cause the device to indicate, to the front-end device, the sequence of objects based on the generated identifier. The set of instructions, when executed by one or more processors of the device, may cause the device to receive, from the front-end device, a request to perform an action based on authenticating the user using the sequence of objects.

DETAILED DESCRIPTION

The following detailed description of example implementations refers to the accompanying drawings. The same reference numbers in different drawings may identify the same or similar elements.

Authenticating a user at a front-end device (e.g., an automated teller machine (ATM), a point-of-sale (PoS) system, and/or another similar customer-facing device) usually involves requesting input of a numerical code associated with the user, such as a personal identifier number (PIN), along with presentation of a physical identifier associated with the user, such as a card. However, this combination is not particularly secure; card skimmers and low-quality cameras can be used to copy the physical identifier and obtain the numerical code, respectively, which renders the front-end device vulnerable.

Some implementations described herein provide for receiving the numerical code associated with the user via audio that corresponds to a subset of a plurality of images. This renders a low-quality camera unable to compromise the user's information because both the audio and the plurality of images have to be captured. As a result, security at a front-end device is increased. Additionally, some implementations described herein provide for a user to generate and use a new or temporary numerical code without knowledge of the actual numerical code. As a result, security is further increased because the numerical code is only stored remotely.

Figure 1A:
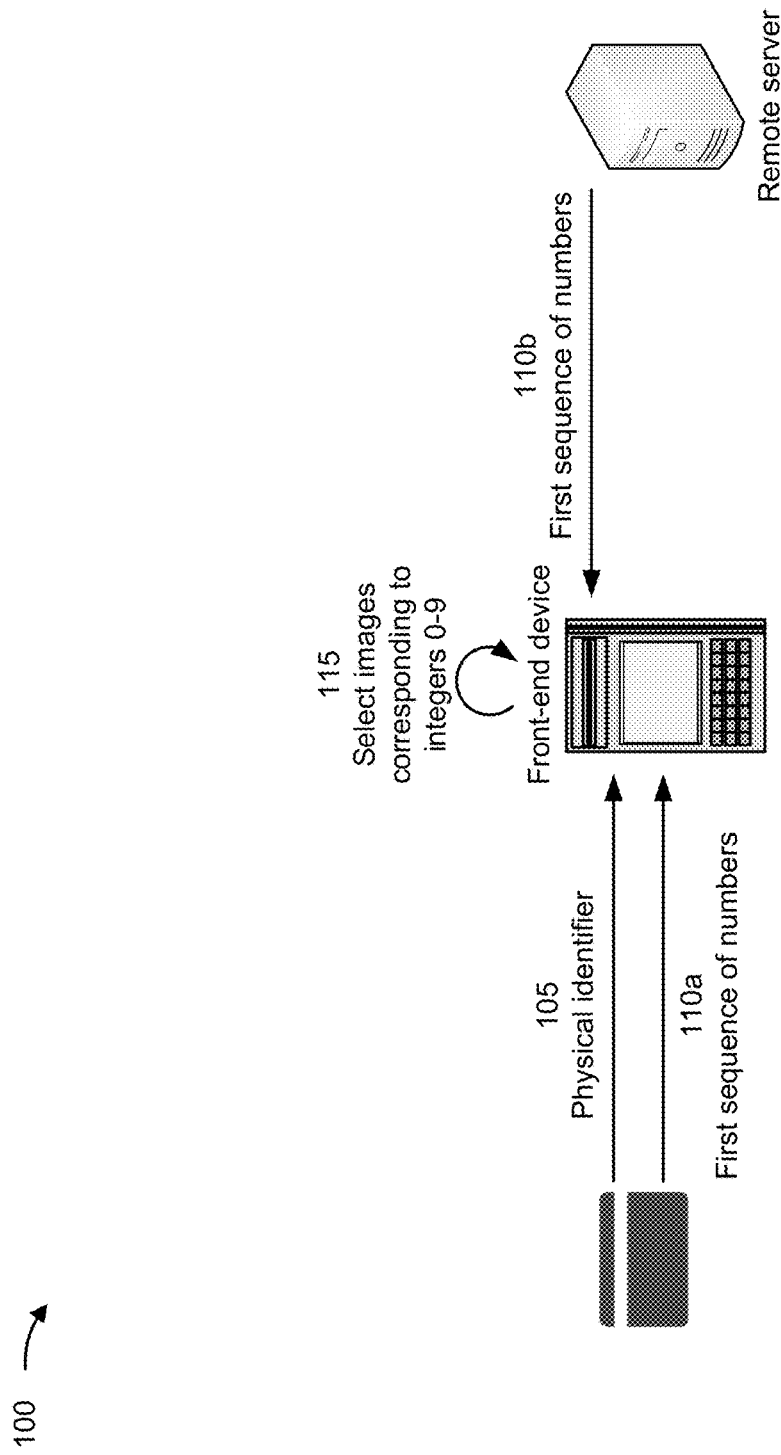
FIGS. 1A-1C are diagrams of an example implementation relating to authenticating a user by speech.
Figure 1B:
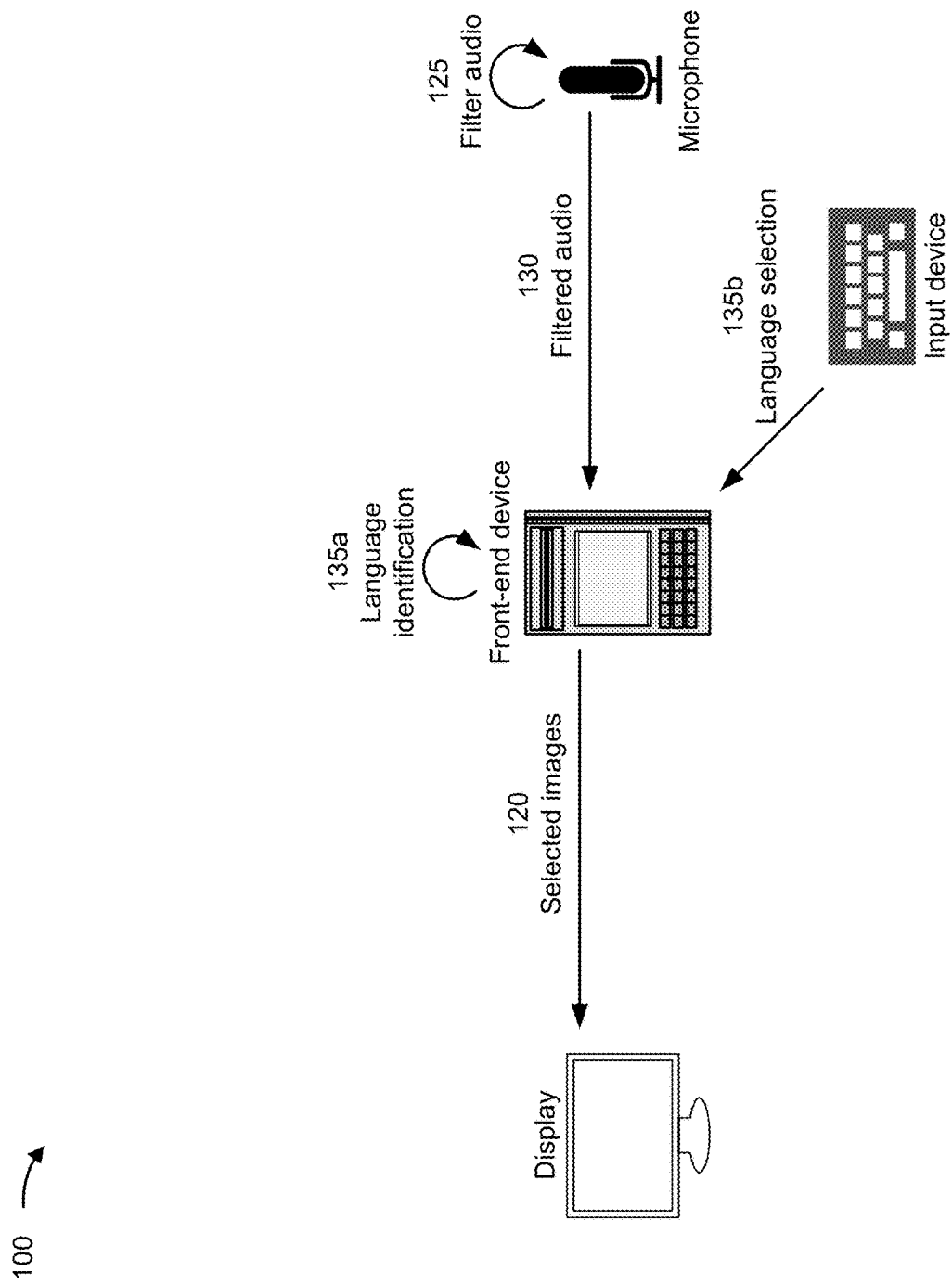
Figure 1C:
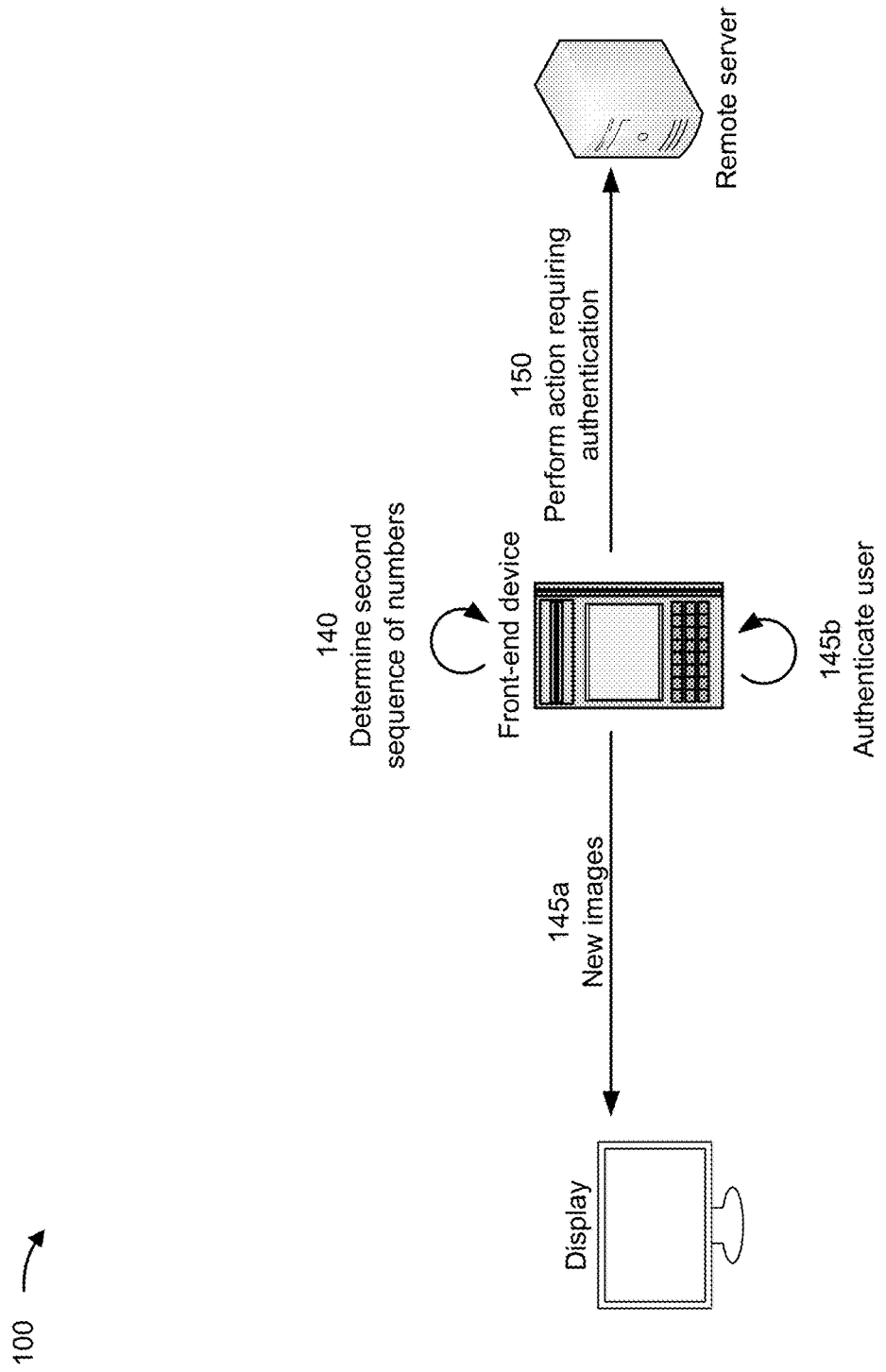

FIGS. 1A-1C are diagrams of an example 100 associated with authenticating a user by speech. As shown in FIGS. 1A-1C, example 100 includes a physical identifier, a front-end device, and a remote server. These devices are described in more detail in connection with FIGS. 4 and 5.

As shown in FIG. 1A and by reference number 105, the front-end device receives the physical identifier associated with a user. In some implementations, the front-end device may receive the physical identifier and generate a digital representation of the physical identifier. For example, the front-end device may generate a digital representation of a name (e.g., in a string format), an account number (e.g., in an integer format), and/or another type of digital data based on the physical identifier. The physical identifier may include a card associated with the user (e.g., with a magnetic stripe, a barcode, a chip, and/or another portion that the front-end device uses to generate the digital representation), a fingerprint and/or other type of biometric identifier associated with the user, and/or another physical object associated with the user from which the front-end device may generate the digital representation.

In some implementations, the front-end device may verify data associated with the physical identifier by contacting the remote server. For example, the front-end device may transmit the digital representation of the physical identifier to the remote server (e.g., as an argument to an application programming interface (API) that is accessible via a network) and receive from the remote server (e.g., returned by the API) an indication of whether the digital representation is valid. In some implementations, the front-end device may determine the remote server to which to transmit the data based on a form, a pattern, and/or content of the digital representation and a mapping of different digital representation forms, patterns, and/or content to different server identifiers (e.g., Internet protocol (IP) addresses and/or other identifiers). Alternatively, the remote server may perform the routing to further remote servers based on a form, a pattern, and/or content of the digital representation.

As shown by reference number 110, the front-end device additionally receives a first sequence of numbers associated with the user. For example, as shown by reference number 110a, the front-end device may receive the first sequence of numbers from the physical identifier (e.g., by generating the first sequence of numbers based on interacting with a portion of the physical identifier). As an alternative, and as shown by reference number 110b, the front-end device may receive the first sequence of numbers from the remote server. For example, the front-end device may receive the first sequence of numbers from the remote server along with a response to a request to verify the data associated with the physical identifier (e.g., as described above). In another example, the front-end device may separately transmit the digital representation of the physical identifier to the remote server (e.g., as an argument to an API that is accessible via a network) and receive from the remote server (e.g., returned by the API) the first sequence of numbers.

In some implementations, the first sequence of numbers may include a PIN or other numerical representation associated with the user. Additionally, or alternatively, the first sequence of numbers may include a first hash of a sequence of numbers associated with the user. As a result, the PIN or other numerical representation associated with the user is more secure.

Alternatively, the first sequence of numbers may remain on the remote server. Accordingly, the remote server may compare the second sequence of numbers determined by the front-end device with the first sequence of numbers associated with the user (e.g., as described in connection with FIG. 2C).

As shown by reference number 115, the front-end device may select a plurality of images corresponding to integers zero through nine. For example, the front-end device may receive the plurality of images from a memory of the front-end device. In some implementations, the plurality of images may be selected randomly (e.g., pseudo-randomly). In one example, the memory may include a set of images, and the front-end device may randomly select from a first subset of the set of images associated with integer zero, randomly select from a second subset of the set of images associated with integer one, and so on. In another example, the front-end device may randomly select ten images from the set of images.

In some implementations, the front-end device may show the plurality of images in association with the corresponding integers (e.g., as described in connection with reference number 120 of FIG. 1B). Additionally, or alternatively, each image has a property that indicates the corresponding integer for the image. For example, one image may include two honeybees, indicating an association with integer two, and another image may include six tacos, indicating an association with integer six, among other examples. In another example, each image may include the associated integer hidden therein (e.g., a distorted visual representation of the associated integer partly blended into a portion of the image). In some implementations, the properties may be stored such that the front-end device selects from different subsets of the set of images for different integers, where each subset includes images with properties indicating an association with a corresponding unique integer from zero to nine. Alternatively, the front-end device may modify the properties on-the-fly. For example, the front-end device may select an image that includes a honeybee on a fixed background, and the front-end device may duplicate the honeybee on the image until the corresponding integer associated with the image is indicated by the quantity of honeybees. In another example, the front-end device may distort a visual representation of the corresponding integer and blend the distorted visual representation into a portion of the background of the image. By using properties to indicate the association, the front-end device may further increase security by showing the plurality of images in a random order (e.g., as described in connection with reference number 120 of FIG. 1B).

As shown in FIG. 1B and by reference number 120, the front-end device may show (e.g., on a display of the front-end device) the plurality of images. In some implementations, as described above, the plurality of images are shown in association with the corresponding integers. For example, the front-end device may instruct the display to show visual representations of the integers adjacent to the corresponding images of the plurality of images. Additionally, or alternatively, the front-end device may instruct the display to show the plurality of images organized in a pattern that indicates the corresponding integers. For example, the display may show the images organized in a pattern that approximates a shape of a numeric keypad such that the pattern indicates which images correspond to which integers. In another example, the display may show the images in a spatial and/or temporal sequence that corresponds to an increasing order of integers zero through nine.

As shown by reference number 125, an audio sensor (e.g., a microphone) of the front-end device may record and filter speech, from a user of the front-end device, as digital audio. For example, the front-end device may instruct the microphone to begin recording after the display shows the plurality of images. The microphone may stop recording a preconfigured amount of time after the display shows the plurality of images and/or may stop recording after detecting a stop word or phrase spoken by the user. Accordingly, the microphone may include an application-specific integrated circuit (ASIC) and/or another type of integrated circuit that performs basic transcription of the recorded speech (e.g., in analog form or after conversion to digital audio) in order to detect the stop word or phrase. Additionally, or alternatively, the integrated circuit may apply one or more filters to the recorded speech (e.g., in analog form, after conversion to digital audio, or a combination thereof), such as removing background noise, normalizing volume, and/or applying a low-pass filter and/or a high-pass filter, among other examples. Accordingly, as shown by reference number 130, the audio sensor may transmit the filtered audio to the front-end device.

In some implementations, and as shown by reference number 135a, the front-end device may identify a language associated with the audio. For example, the front-end device may apply an n-gram model, a Markov model, a dictionary method (e.g., based on word relevance), and/or another type of model to guess a language in which the user spoke. Additionally, or alternatively, and as shown by reference number 135b, the front-end device may receive an indication of the language associated with the audio from an input device of the front-end device (e.g., a touchscreen, a keyboard, and/or another type of device that the user uses to input the indication of the language to the front-end device). Accordingly, the front-end device may select a corresponding speech-to-text algorithm to apply based on the language (e.g., as described in connection with reference number 140 of FIG. 1C).

As described above, the audio encodes speech from the user of the front-end device. Accordingly, the audio may include a sequence of words that describe a subset of the plurality of images. For example, the user may have described objects in the subset of the plurality of images, and the microphone generated the audio (e.g., a filtered audio signal, as described above) encoding the user's speech with the sequence of words describing the objects. Thus, as shown in FIG. 1C and by reference number 140, the front-end device may determine a second sequence of numbers based on the sequence of words in the audio. In some implementations, the second sequence of numbers may correspond to a PIN or other numerical representation associated with the user. Additionally, or alternatively, the second sequence of numbers may include a second hash of a sequence of numbers based on the sequence of words in the audio. As a result, the PIN or other numerical representation associated with the user is more secure.

In some implementations, the front-end device may decode the sequence of words using a speech-to-text algorithm (and the identified language, as described above). Accordingly, the front-end device may determine a transcription (e.g., a text file and/or another similar type of data structure) including the sequence of words based on the filtered audio signal. Further, the front-end device may map the sequence of words to the subset of the plurality of images. For example, the front-end device may map a sequence of words including "honeybee waterfall boat and airplane" to indicators (e.g., index numbers, file names, checksums, and/or other alphanumeric indicators) of an image including a honeybee, an image including a waterfall, an image including a boat, and an image including an airplane, respectively. In some implementations, the front-end device may map different portions of the sequence of words to different images in the subset of the plurality of images. In the example above, the front-end device may map the word "honeybee" in the sequence to the indicator of the image including the honeybee, and so on, discarding superfluous words (e.g., conjunctions, such as the "and," articles, and/or similar parts of speech). The mapping may be based on a stored data structure (e.g., a relational database, a graphical database, and/or another similar type of data structure) that associates each image, in the set of images from which the plurality of images were selected, with one or more words and/or phrases.

In some implementations, multiple words and/or phrases may describe an image. Accordingly, the front-end device may receive (e.g., from the memory of the front-end device), for each image of the plurality of images, a plurality of words or phrases describing the image. Additionally, the front-end device may identify, for each image in the subset of the plurality of images, one of the plurality of words or phrases, describing the image, in the sequence of words. For example, one image may be associated with the following strings: "bee," "honeybee," "buzzing bee," "flying bee," "hornet," "yellow jacket," and "yellow insect" (e.g., according to the stored data structure); therefore, the front-end device may identify the word "honeybee" in the sequence of words and map the word "honeybee" to an indicator of the associated image.

Based on the subset of the plurality of images, the front-end device determines the second sequence of numbers that corresponds to the subset of the plurality of images. Accordingly, the front-end device may determine whether the second sequence of numbers matches the first sequence of numbers associated with the user. As used herein, a "match" between sequences of numbers refers to the presence of a same set of integers in a same order in both sequences. In some implementations, the front-end device compares the first hash of the sequence of numbers associated with the user with the second hash of the sequence of numbers corresponding to the subset of the plurality of images.

Alternatively, the front-end device may transmit, and the remote server may receive, the second sequence of numbers that corresponds to the subset of the plurality of images. Accordingly, the remote server may compare the second sequence of numbers determined by the front-end device with the first sequence of numbers associated with the user (e.g., as described in connection with FIG. 2C). Further, the remote server may transmit, and the front-end device may receive, an indication associated with comparing the sequences of numbers such that the front-end device determines to select a new plurality of images to display or to authenticate the user based on the indication.

When the sequences of numbers do not match, the front-end device may select a new plurality of images to display, as shown by reference number 145a. The front-end device may select the new plurality of images as described above. Accordingly, the front-end device may show, on the display of the front-end device, the new plurality of images. The front-end device may display the new plurality of images in association with corresponding integers, and/or properties of the new plurality of images may indicate the corresponding integers, as described above.

The front-end device may therefore receive new audio that includes a new sequence of words that describe a subset of the new plurality of images, map the new sequence of words to the subset of the new plurality of images, and determine whether a third sequence of numbers corresponding to the subset of the new plurality of images matches the first sequence of numbers associated with the user. Accordingly, the front-end device may iterate the process described in connection with FIGS. 1A-1C in order to authenticate the user. In some implementations, the front-end device may iterate the process a quantity of times until a threshold is satisfied, after which the front-end device may refuse to authenticate the user. For example, the front-end device may refuse to authenticate the user for at least a preconfigured amount of time and/or until the user performs a verification step (e.g., engaging in a two-factor authentication process with the remote server and/or the front-end device and/or providing a second physical identifier associated with the user to the front-end device, among other examples). The threshold may be preconfigured or may be dynamic based on factors (e.g., one or more factors), associated with fraud, determined by the front-end device. For example, the front-end device may modify the threshold based on a location associated with the front-end device (e.g., increase when the location satisfies a geographic threshold associated with the user) and/or based on a system time when the user requests authentication (e.g., decrease when the system time is within a time threshold associated with suspicious activity), among other examples.

On the other hand, when the sequences of numbers match, the front-end device may authenticate the user, as shown by reference number 145b. For example, the front-end device may instruct the display to show private information (e.g., account balances) based on the authentication. Additionally, or alternatively, and as shown by reference number 150, the front-end device may contact the remote server to perform an action based on authenticating the user. For example, the front-end device may transmit a request to modify an account associated with the user (e.g., by performing a transaction using the account) based on authenticating the user. The front-end device may include, with the request, a token, the second sequence of numbers, and/or another indication that the user has been authenticated.

By using techniques as described in connection with FIGS. 1A-1C, the front-end device authenticates the user via audio corresponding to the subset of a plurality of images. As a result, security at the front-end device is increased.

As indicated above, FIGS. 1A-1C are provided as an example. Other examples may differ from what is described with regard to FIGS. 1A-1C.

Figure 2A:
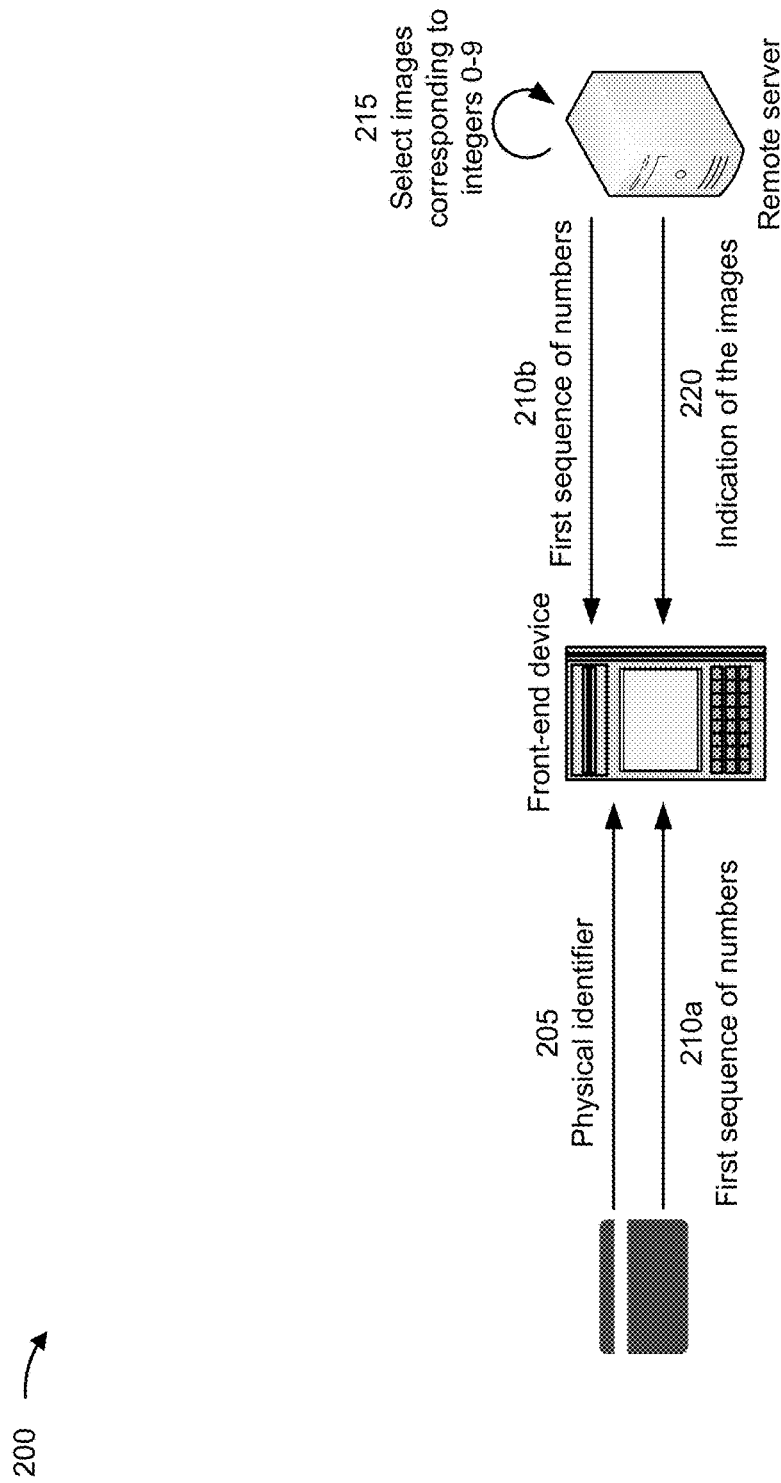
FIGS. 2A-2C are diagrams of an example implementation relating to authenticating a user by speech.
Figure 2B:
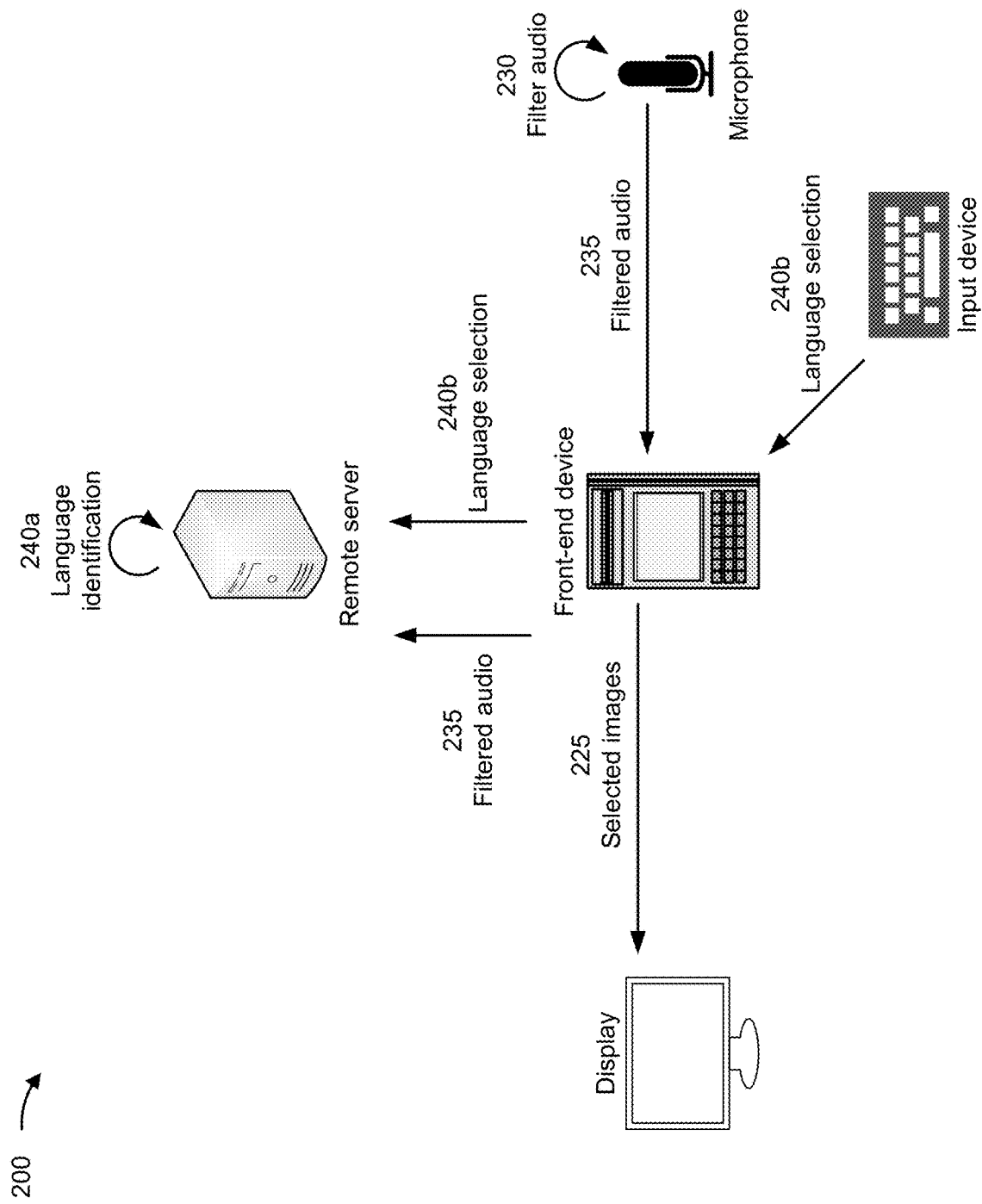
Figure 2C:
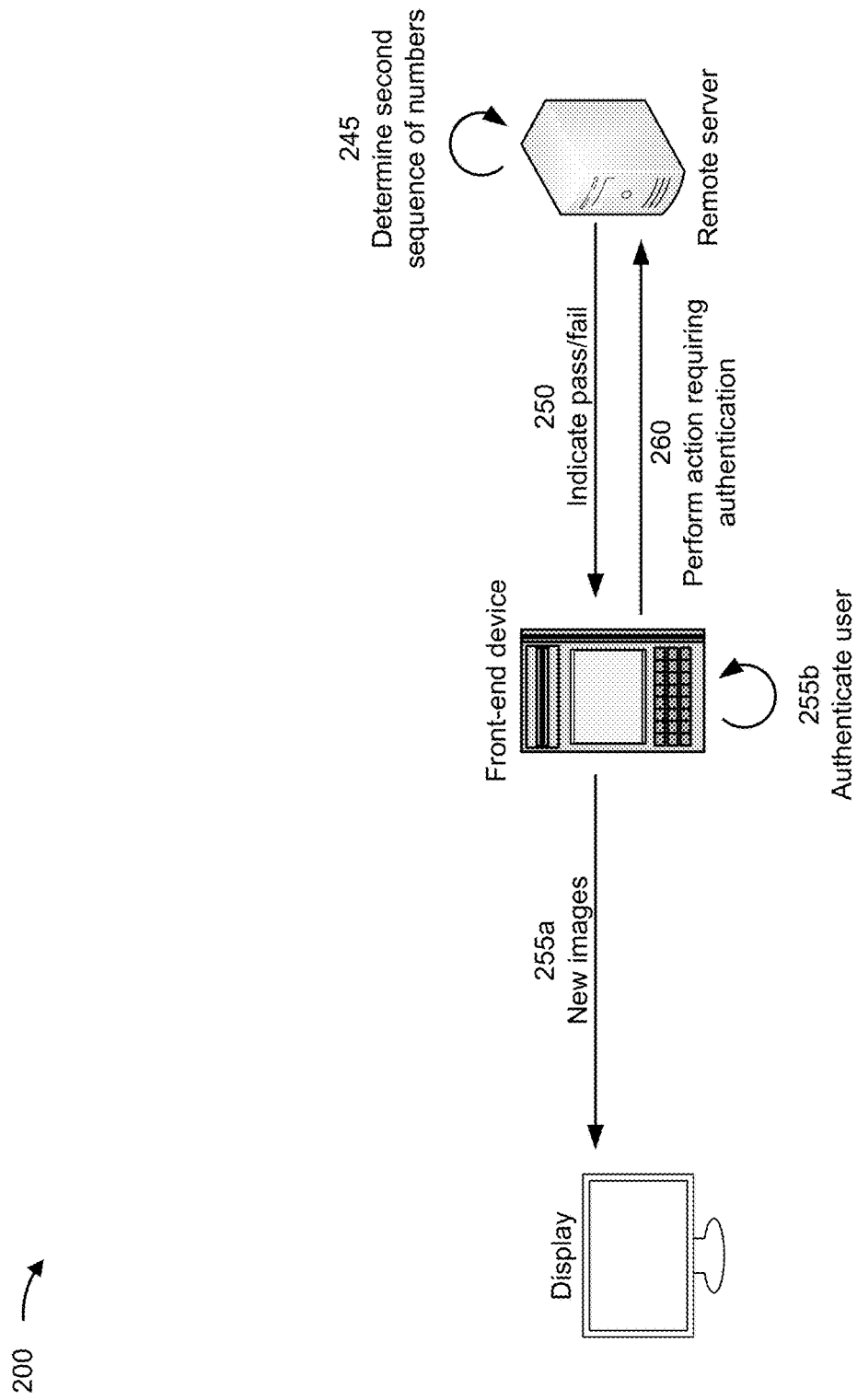

FIGS. 2A-2C are diagrams of an example 200 associated with authenticating a user by speech. As shown in FIGS. 2A-2C, example 200 includes a physical identifier, a front-end device, and a remote server. These devices are described in more detail in connection with FIGS. 4 and 5. Example 200 is similar to example 100, but the plurality of images for display are selected at the remote server rather than at the front-end device.

As shown in FIG. 2A and by reference number 205, the front-end device receives the physical identifier associated with a user. For example, the front-end device may receive the physical identifier as described in connection with reference number 105 of FIG. 1A.

As shown by reference number 210, the front-end device additionally receives a first sequence of numbers associated with the user. For example, as shown by reference number 210a, the front-end device may receive the first sequence of numbers from the physical identifier (e.g., by generating the first sequence of numbers based on interacting with a portion of the physical identifier). As an alternative, and as shown by reference number 210b, the front-end device may receive the first sequence of numbers from the remote server.

Alternatively, the first sequence of numbers may remain on the remote server. Accordingly, the remote server may compare the second sequence of numbers determined by the front-end device with the first sequence of numbers associated with the user (e.g., as described in connection with reference number 245).

As shown by reference number 215, the remote server may select a plurality of images corresponding to integers zero through nine. For example, the remote server may select the plurality of images similarly as described for the front-end device in connection with reference number 115 of FIG. 1A.

In some implementations, and as described in connection with FIG. 1A, each image has a property that indicates the corresponding integer for the image. Accordingly, the properties may be stored such that the remote server selects from different subsets of the set of images for different integers, where each subset includes images with properties indicating an association with a corresponding unique integer from zero to nine. Alternatively, the remote server may modify the properties on-the-fly. As a result, the remote server helps the front-end device conserve processing resources that would otherwise have been used to modify properties of the plurality of images.

As shown by reference number 220, the remote server may indicate, to the front-end device, the plurality of images to show. In some implementations, the remote server may transmit the plurality of images (e.g., a plurality of files or other data structures encoding the images) to the front-end device. Alternatively, the remote server may transmit identifiers associated with a subset of data structures, of a set of data structures, stored at the front-end device and encoding images of the sequence of objects. For example, a memory of the front-end device may store the same set of data structures, in association with the same identifiers, in a memory of the remote server. Accordingly, the remote server may indicate which subset of images to use by transmitting identifiers that correspond to the subset of data structures encoding that subset of images. As a result, communication overhead between the remote server and the front-end device is reduced, which conserves processing resources and power at both the remote server and the front-end device.

In some implementations, the front-end device may transmit a request to authenticate the user to the remote server such that the remote server indicates the plurality of images in response to the request. In some implementations, the request may be transmitted with an account identifier associated with the user. For example, the account identifier may be based on the physical identifier associated with the user, as described in connection with FIG. 1A. Accordingly, the remote server may verify the account identifier before indicating the plurality of images to the front-end device. For example, the remote server may verify that a pattern and/or format of the account identifier matches an expected pattern and/or format, respectively. Additionally, or alternatively, the remote server may verify that the account identifier (or a hash thereof) appears in a list (or other similar type of data structure) of valid account identifiers (or hashes thereof). Additionally, or alternatively, the request may include additional information such that the remote server verifies the account identifier against the additional information. For example, the request may include an indication of a name of the user (e.g., a string encoding the name), and the remote server may verify that the name and the account identifier match a corresponding name and account identifier stored in a list (or other similar type of data structure) of valid account identifiers.

As shown in FIG. 2B and by reference number 225, the front-end device may show (e.g., on a display of the front-end device) the plurality of images. In some implementations, as described in connection with FIG. 1B, the plurality of images are shown in association with the corresponding integers. Additionally, or alternatively, as described in connection with FIG. 1B, the front-end device may instruct the display to show the plurality of images organized in a pattern that indicates the corresponding integers.

As shown by reference number 230, an audio sensor (e.g., a microphone) of the front-end device may record and filter speech, from a user of the front-end device, as digital audio. For example, the microphone may record and filter the speech as described in connection with reference number 225 of FIG. 1B. Additionally, as shown by reference number 235, the audio sensor may transmit the filtered audio to the front-end device. As further shown by reference number 235, the front-end device may transmit the filtered audio to the remote server for processing in order to conserve processing resources and power at the front-end device. Alternatively, the front-end device may determine a sequence of words based on the filtered audio (e.g., as described in connection with FIG. 1C) and transmit the sequence of words to the remote server in order to reduce communication overhead between the remote server and the front-end device.

In some implementations, and as shown by reference number 240*a*, the remote server may identify a language associated with the audio. For example, the remote server may identify the language as similarly described in connection with reference number 135*a* of FIG. 1B. In implementations where the front-end device determines a sequence of words based on the filtered audio and transmits the sequence of words to the remote server, the front-end device may identify the language associated with the audio (e.g., as described in connection with reference number 135*a* of FIG. 1B). Alternatively, and as shown by reference number 240*b*, the front-end device may receive an indication of the language associated with the audio from an input device of the front-end device (e.g., as described in connection with reference number 135*b* of FIG. 1B). As further shown by reference number 240*b*, the front-end device may transmit the indication of the language to the remote server.

As described above, the audio encodes speech from the user of the front-end device. Accordingly, the audio may include a sequence of words that describe a subset of the plurality of images. Thus, as shown in FIG. 2C and by reference number 245, the remote server may determine a second sequence of numbers based on the sequence of words in the audio. For example, the remote server may determine the second sequence of numbers as similarly described in connection with reference number 140 of FIG. 1C.

Accordingly, the remote server may determine whether the second sequence of numbers matches the first sequence of numbers associated with the user. In some implementations, the remote server compares a first hash of the sequence of numbers associated with the user with a second hash of the sequence of numbers corresponding to the subset of the plurality of images. Accordingly, the remote server indicates to the front-end device whether the user has been authenticated, as shown by reference number 250. For example, the remote server may transmit a Boolean and/or another similar pass/fail indicator based on whether the second sequence of numbers matches the first sequence of numbers associated with the user.

When the sequences of numbers do not match, the remote server may select a new plurality of images to display and transmit the new plurality of images to the front-end device. Accordingly, the front-end device may show, on the display of the front-end device, the new plurality of images, as shown by reference number 255*a*. The front-end device may display the new plurality of images in association with corresponding integers, and/or properties of the new plurality of images may indicate the corresponding integers, as described above.

The front-end device may therefore receive new audio that includes a new sequence of words that describe a subset of the new plurality of images and transmit the new audio (and/or the new sequence of words) to the remote server, such that the remote server may determine whether a third sequence of numbers corresponding to a subset of the new plurality of images matches the first sequence of numbers associated with the user. Accordingly, the remote server may iterate the process described in connection with FIGS. 2A-2C in order to authenticate the user. In some implementations, the remote server may iterate the process a quantity of times until a threshold is satisfied, after which the remote server may refuse to authenticate the user. For example, the remote server may refuse to authenticate the user for at least a preconfigured amount of time and/or until the user performs a verification step (e.g., engaging in a two-factor authentication process with the remote server and/or the front-end device and/or providing a second physical identifier associated with the user to the front-end device, among other examples). The threshold may be preconfigured or may be dynamic based on factors (e.g., one or more factors), associated with fraud, determined by the remote server. For example, the remote server may modify the threshold based on a location associated with the front-end device (e.g., increase when the location satisfies a geographic threshold associated with the user) and/or based on a system time when the user requests authentication (e.g., decrease when the system time is within a time threshold associated with suspicious activity), among other examples.

On the other hand, when the sequences of numbers match, the front-end device may authenticate the user based on the indication from the remote server, as shown by reference number 255*b*. Accordingly, the front-end device may instruct the display to show private information (e.g., account balances) based on the authentication. Additionally, or alternatively, and as shown by reference number 260, the front-end device may contact the remote server to perform an action based on authenticating the user. For example, the front-end device may transmit a request to modify an account associated with the user (e.g., by performing a transaction using the account) based on authenticating the user.

In some implementations, examples 100 and 200 may be combined. For example, the front-end device may receive indications of the plurality of images from the remote server (e.g., as described in connection with FIG. 2A) and determine whether the second sequence of numbers matches the first sequence of numbers at the front-end device (e.g., as described in connection with FIG. 1C). In another example, the front-end device may select the plurality of images to show (e.g., as described in connection with FIG. 1A), and the remote server may determine whether the second sequence of numbers matches the first sequence of numbers (e.g., as described in connection with FIG. 2C). In both of these examples, either the front-end device or the remote server may determine the sequence of words based on the filtered audio, depending on the implementation.

By using techniques as described in connection with FIGS. 2A-2C, the front-end device authenticates the user via audio corresponding to the subset of a plurality of images. As a result, security at the front-end device is increased. Additionally, the remote server has flexibility to modify and select the plurality of images, which conserves processing resources at the front-end device.

As indicated above, FIGS. 2A-2C are provided as an example. Other examples may differ from what is described with regard to FIGS. 2A-2C.

Figure 3A:
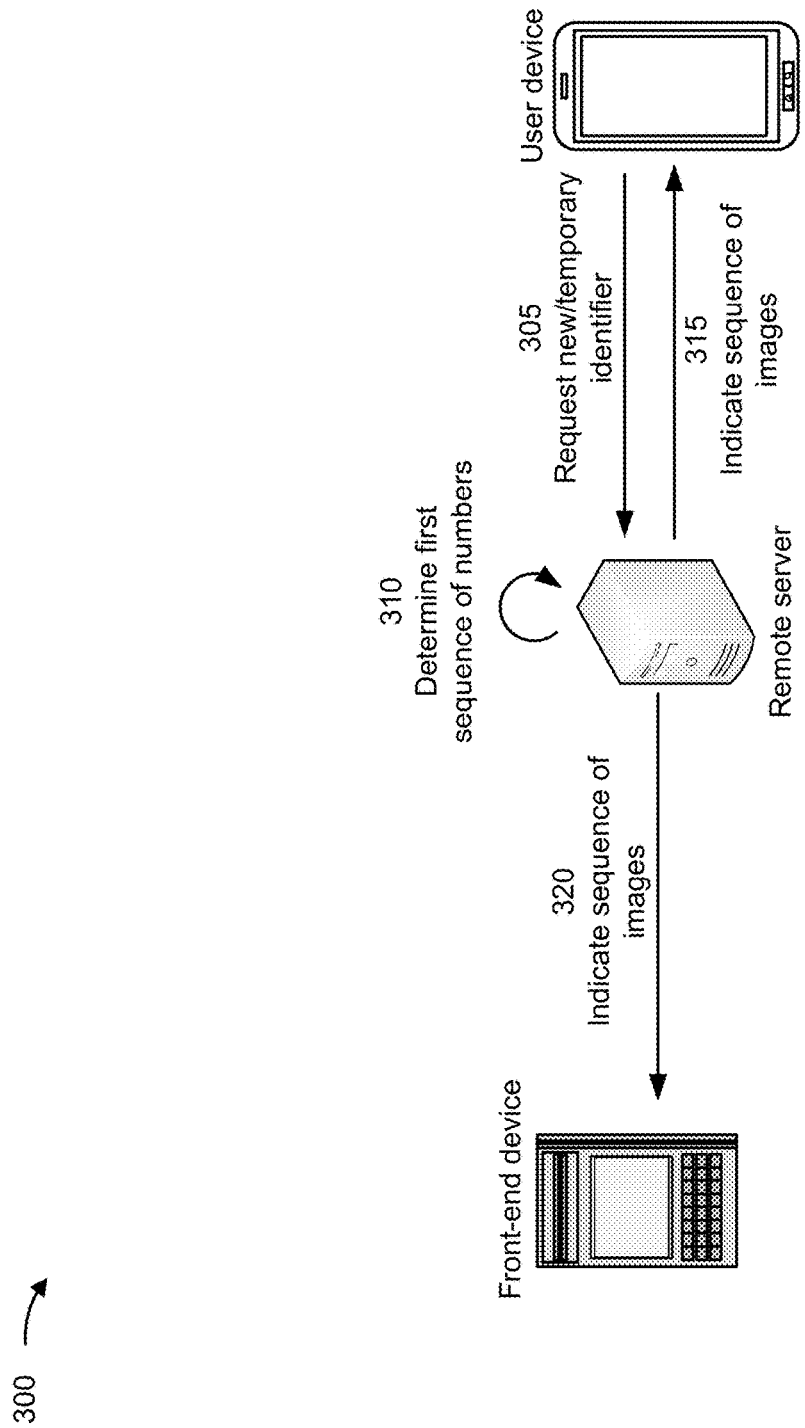
FIGS. 3A-3B are diagrams of an example implementation relating to generating a new or temporary identifier for authenticating a user by speech.
Figure 3B:
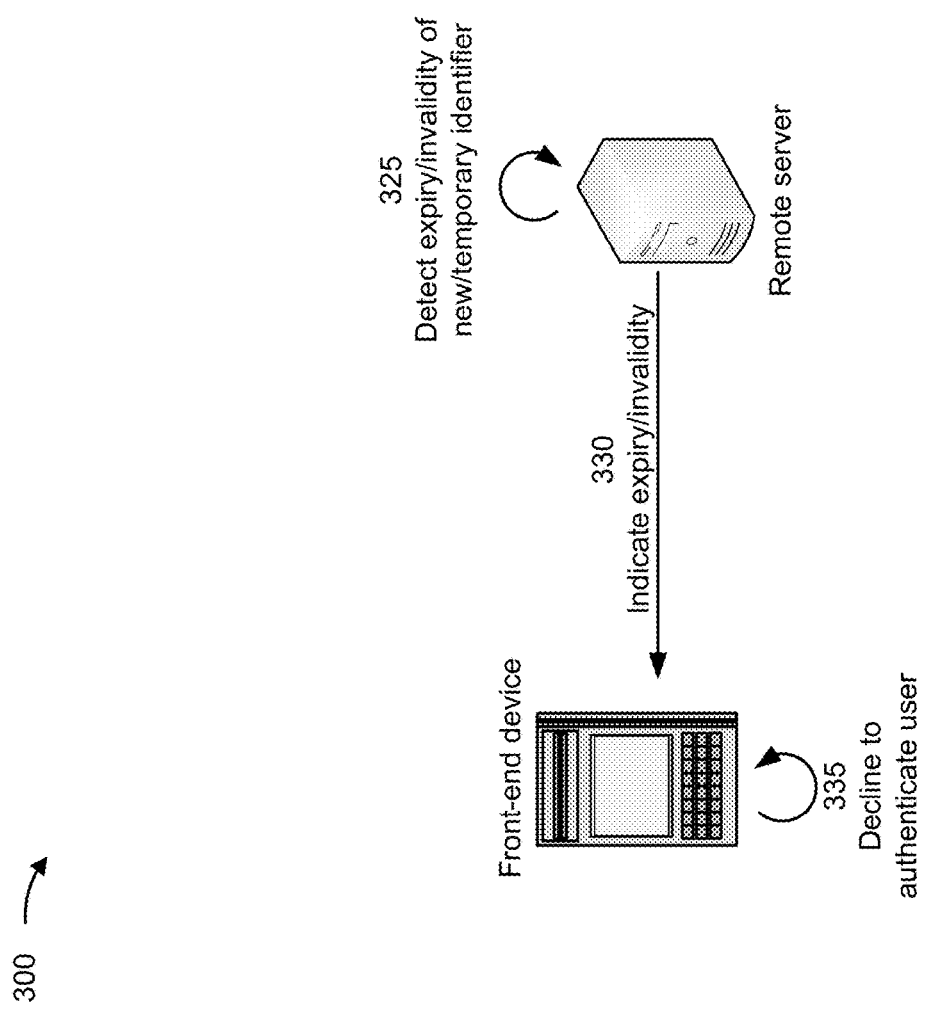

FIGS. 3A-3B are diagrams of an example 300 associated with authenticating a user by speech. As shown in FIGS. 3A-3B, example 300 includes a user device, a front-end device, and a remote server. These devices are described in more detail in connection with FIGS. 4 and 5.

As shown in FIG. 3A and by reference number 305, the user device may transmit, and the remote server may receive, a request for an identifier associated with the user of the user device. For example, the user may generate the request by interacting with an application on the user device, and the application may transmit the request to the remote server. In some implementations, the identifier may include a PIN or other numerical representation associated with the user. For example, the user may request a new PIN to use. Alternatively, the user may request a temporary PIN to provide to another person to use.

In some implementations, the user device may transmit the request with a credential (e.g., at least one credential) associated with the user. For example, the user device may provide a username and password associated with the user, a passcode associated with the user, biometric information associated with the user, and/or another type of credential with the request. Accordingly, the remote server may verify the credential before accepting the request. In some implementations, the remote server may apply a two-factor authentication procedure before accepting the request.

Accordingly, the remote server may generate an identifier, associated with the user, based on the request. For example, as shown by reference number 310, the remote server may determine a first sequence of numbers, associated with the user, based on the request. The remote server may randomly (e.g., pseudo-randomly) generate a new sequence of numbers. In some implementations, the first sequence of numbers may include a PIN or other numerical representation associated with the user.

As shown by reference number 315, the remote server may indicate, to the user device, a sequence of objects based on the generated identifier associated with the user. For example, the remote server may select (e.g., randomly, such as pseudo-randomly) an image corresponding to each integer in the generated identifier (e.g., as described in connection with reference number 215 of FIG. 2A). In some implementations, the remote server may modify properties of the selected images in order to indicate associations to integers of the generated identifier (e.g., as described in connection with FIG. 2A). As described above, the user device may provide the credential associated with the user before the remote server indicates the sequence of objects to the user device.

In some implementations, the remote server may transmit the sequence of images (e.g., a plurality of files or other data structures encoding the images) to the user device. Alternatively, the remote server may transmit identifiers associated with a subset of data structures, of a set of data structures, stored at the user device and encoding images of the sequence of objects. For example, a memory of the user device may store the same set of data structures, in association with the same identifiers, as is stored in a memory of the remote server. Accordingly, the remote server may indicate which subset of images to use by transmitting identifiers that correspond to the subset of data structures encoding that subset of images. As a result, communication overhead between the remote server and the user device is reduced, which conserves processing resources and power at both the remote server and the user device.

By transmitting the sequence of images to the user device rather than the generated identifier, the remote server increases security because the user device and the user both lack knowledge of the generated identifier. Additionally, the generated identifier may be a temporary identifier to provide to another person to use such that the user may share the sequence of images without sharing the actual generated identifier, which further increases security.

As shown by reference number 320, the remote server may additionally indicate, to the front-end device, the sequence of objects based on the generated identifier. In some implementations, the remote server may transmit the sequence of images (e.g., a plurality of files or other data structures encoding the images) to the front-end device. Alternatively, the remote server may transmit identifiers associated with a subset of data structures, of a set of data structures, stored at the front-end device and encoding images of the sequence of objects. For example, a memory of the front-end device may store the same set of data structures, in association with the same identifiers, as is stored in a memory of the remote server. Accordingly, the remote server may indicate which subset of images to use by transmitting identifiers that correspond to the subset of data structures encoding that subset of images. As a result, communication overhead between the remote server and the front-end device is reduced, which conserves processing resources and power at both the remote server and the front-end device. By transmitting the sequence of images to the front-end device rather than the generated identifier, the remote server increases security because a bad actor may not obtain the generated identifier by intercepting communications between the remote server and the front-end device or by accessing the memory of the front-end device.

In some implementations, the front-end device may transmit, and the remote server may receive, a request to authenticate the user such that the remote server indicates the sequence of images to the front-end device in response to the request. For example, the user (or another person to whom the user has provided a physical identifier and the sequence of images) may request authentication at the front-end device at a later time than when the user requested a new and/or temporary identifier using the user device.

In some implementations, as shown in FIG. 3B and by reference number 325, the remote server may verify, before indicating the sequence of objects to the front-end device, that the generated identifier has not expired and/or that a location associated with the front-end device satisfies a geographic threshold. For example, the generated identifier may expire based on a time window associated with the generated identifier and/or based on a quantity of uses of the generated identifier. The time window and/or the quantity of uses may be preconfigured (e.g., according to a default value or other stored value), or the user may indicate the time window and/or the quantity of uses, via the user device, when requesting that the remote server generate the identifier associated with the user. Additionally, or alternatively, the generated identifier may work within a radius (or other geographic threshold) associated with a location (e.g., a location of the user, a default location or other stored location, or a location specified by the user via the user device). The radius may be preconfigured (e.g., according to a default value or other stored value), or the user may indicate the radius, via the user device, when requesting that the remote server generate the identifier associated with the user.

As shown by reference number 330, the remote server may indicate expiry and/or invalidity of the generated identifier. Accordingly, as shown by reference number 335, the front-end device may decline to authenticate the user based on the expiry and/or invalidity of the generated identifier.

On the other hand, the front-end device may authenticate the user (e.g., as described in connection with FIGS. 2B-2C). In some implementations, the front-end device may therefore transmit, and the remote server may receive, a request to perform an action based on authenticating the user using the sequence of objects. For example, the front-end device may transmit the request as described in connection with reference number 150 of FIG. 1C and/or reference number 260 of FIG. 2C. For example, the front-end device may transmit a request to modify an account associated with the user (e.g., by performing a transaction using the account) based on authenticating the user.

By using techniques as described in connection with FIGS. 3A-3B, the user can generate and use a new or temporary numerical code without knowledge of the actual numerical code. As a result, security is further increased because the numerical code is only stored remotely.

As indicated above, FIGS. 3A-3B are provided as an example. Other examples may differ from what is described with regard to FIGS. 3A-3B.

Figure 4:
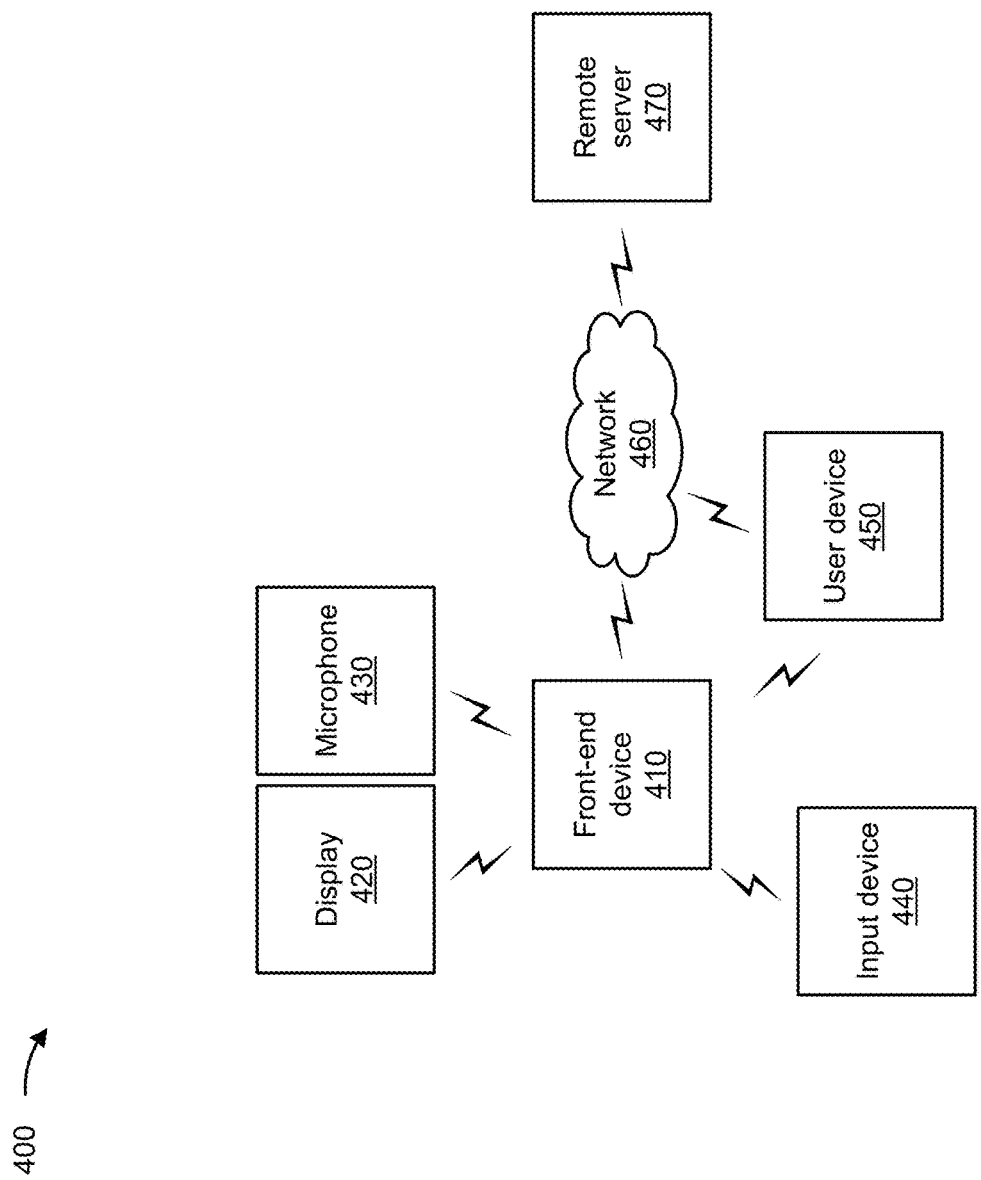
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a front-end device 410 with a display 420, a microphone 430, and an input device 440, a user device 450, a network 460, and/or a remote server 470. Devices of environment 400 may interconnect via wired connections and/or wireless connections.

The front-end device 410 includes one or more devices capable of facilitating an electronic transaction. For example, the front-end device 410 may include a PoS terminal, a payment terminal (e.g., a credit card terminal, a contactless payment terminal, a mobile credit card reader, or a chip reader), and/or an ATM. In some implementations, the front-end device 410 includes an access control terminal (e.g., used to control physical access to a secure area), such as an access control panel used to control an access-controlled entry (e.g., a turnstile, a door, a gate, or another physical barrier). The front-end device 410 may include a display 420 to transmit information to a user and a microphone 430 to obtain audio from the user. The front-end device 410 may further include an input device 440 to facilitate obtaining data (e.g., account information) and/or to facilitate interaction with and/or authorization from the user. Example input components of the front-end device 410 include a number keypad, a touchscreen, a magnetic stripe reader, a chip reader, and/or a radio frequency (RF) signal reader (e.g., a near-field communication (NFC) reader).

The user device 450 includes one or more devices capable of being used for an electronic transaction. The user device 450 may include a communication device and/or a computing device. For example, the user device 450 may include a wireless communication device, a mobile phone, a user equipment, a tablet computer, a wearable communication device (e.g., a smart wristwatch, a pair of smart eyeglasses, a head mounted display, or a virtual reality headset), or a similar type of device. Additionally, or alternatively, the user device 450 may be capable of communicating with the remote server 470 via the network 460, as described elsewhere herein.

The remote server 470 includes one or more devices capable of processing, authorizing, and/or facilitating a transaction. For example, the remote server 470 may include one or more servers and/or computing hardware (e.g., in a cloud computing environment or separate from a cloud computing environment) configured to receive and/or store information associated with processing an electronic transaction. The remote server 470 may process a transaction, such as to approve (e.g., permit, authorize, or the like) or decline (e.g., reject, deny, or the like) the transaction and/or to complete the transaction if the transaction is approved. The remote server 470 may process the transaction based on information received from the front-end device 410, such as transaction data (e.g., information that identifies a transaction amount, a merchant, a time of a transaction, a location of the transaction, or the like), account information communicated to the front-end device 410, and/or information stored by the remote server 470 (e.g., for fraud detection).

The remote server 470 may be associated with a financial institution (e.g., a bank, a lender, a credit card company, or a credit union) and/or may be associated with a transaction card association that authorizes a transaction and/or facilitates a transfer of funds. For example, the remote server 470 may be associated with an issuing bank, an acquiring bank (or merchant bank) associated with the merchant, and/or a transaction card association (e.g., VISA® or MASTER-CARD®) associated with the front-end device 410. Based on receiving information from the front-end device 410, one or more devices of the remote server 470 may communicate to authorize a transaction and/or to transfer funds from an account associated with the user to an account of an entity (e.g., a merchant) associated with the front-end device 410.

The network 460 includes one or more wired and/or wireless networks. For example, the network 460 may include a cellular network, a public land mobile network, a local area network, a wide area network, a metropolitan area network, a telephone network, a private network, the Internet, and/or a combination of these or other types of networks. The network 460 enables communication among the devices of environment 400. In some implementations, the remote server 470 may communicate with the front-end device 410 using a first network (e.g., a wired network) and may communicate with the user device 450 using a second network (e.g., a wireless network).

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
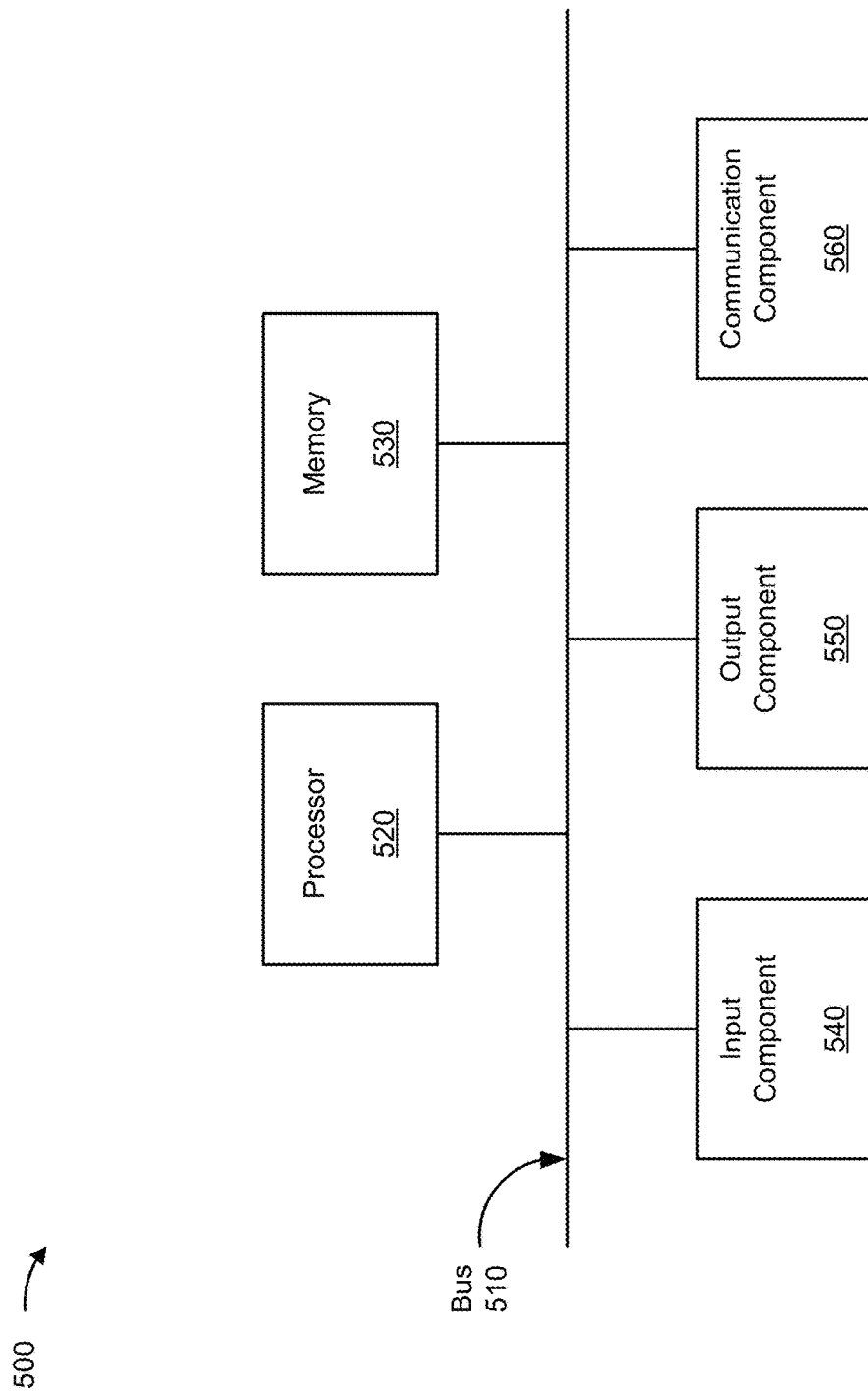
FIG. 5 is a diagram of example components of one or more devices of FIG. 4.

FIG. 5 is a diagram of example components of a device 500, which may correspond to a front-end device, a remote server, and/or a user device. In some implementations, a front-end device, a remote server, and/or a user device include one or more devices 500 and/or one or more components of device 500. As shown in FIG. 5, device 500 may include a bus 510, a processor 520, a memory 530, an input component 540, an output component 550, and a communication component 560.

Bus 510 includes one or more components that enable wired and/or wireless communication among the components of device 500. Bus 510 may couple together two or more components of FIG. 5, such as via operative coupling, communicative coupling, electronic coupling, and/or electric coupling. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform one or more operations or processes described elsewhere herein.

Memory 530 includes volatile and/or nonvolatile memory. For example, memory 530 may include random access memory (RAM), read only memory (ROM), a hard disk drive, and/or another type of memory (e.g., a flash memory, a magnetic memory, and/or an optical memory). Memory 530 may include internal memory (e.g., RAM, ROM, or a hard disk drive) and/or removable memory (e.g., removable via a universal serial bus connection). Memory 530 may be a non-transitory computer-readable medium. Memory 530 stores information, instructions, and/or software (e.g., one or more software applications) related to the operation of device 500. In some implementations, memory 530 includes one or more memories that are coupled to one or more processors (e.g., processor 520), such as via bus 510.

Input component 540 enables device 500 to receive input, such as user input and/or sensed input. For example, input component 540 may include a touch screen, a keyboard, a keypad, a mouse, a button, a microphone, a switch, a sensor, a global positioning system sensor, an accelerometer, a gyroscope, and/or an actuator. Output component 550 enables device 500 to provide output, such as via a display, a speaker, and/or a light-emitting diode. Communication component 560 enables device 500 to communicate with other devices via a wired connection and/or a wireless connection. For example, communication component 560 may include a receiver, a transmitter, a transceiver, a modem, a network interface card, and/or an antenna.

Device 500 may perform one or more operations or processes described herein. For example, a non-transitory computer-readable medium (e.g., memory 530) may store a set of instructions (e.g., one or more instructions or code) for execution by processor 520. Processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry is used instead of or in combination with the instructions to perform one or more operations or processes described herein. Additionally, or alternatively, processor 520 may be configured to perform one or more operations or processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
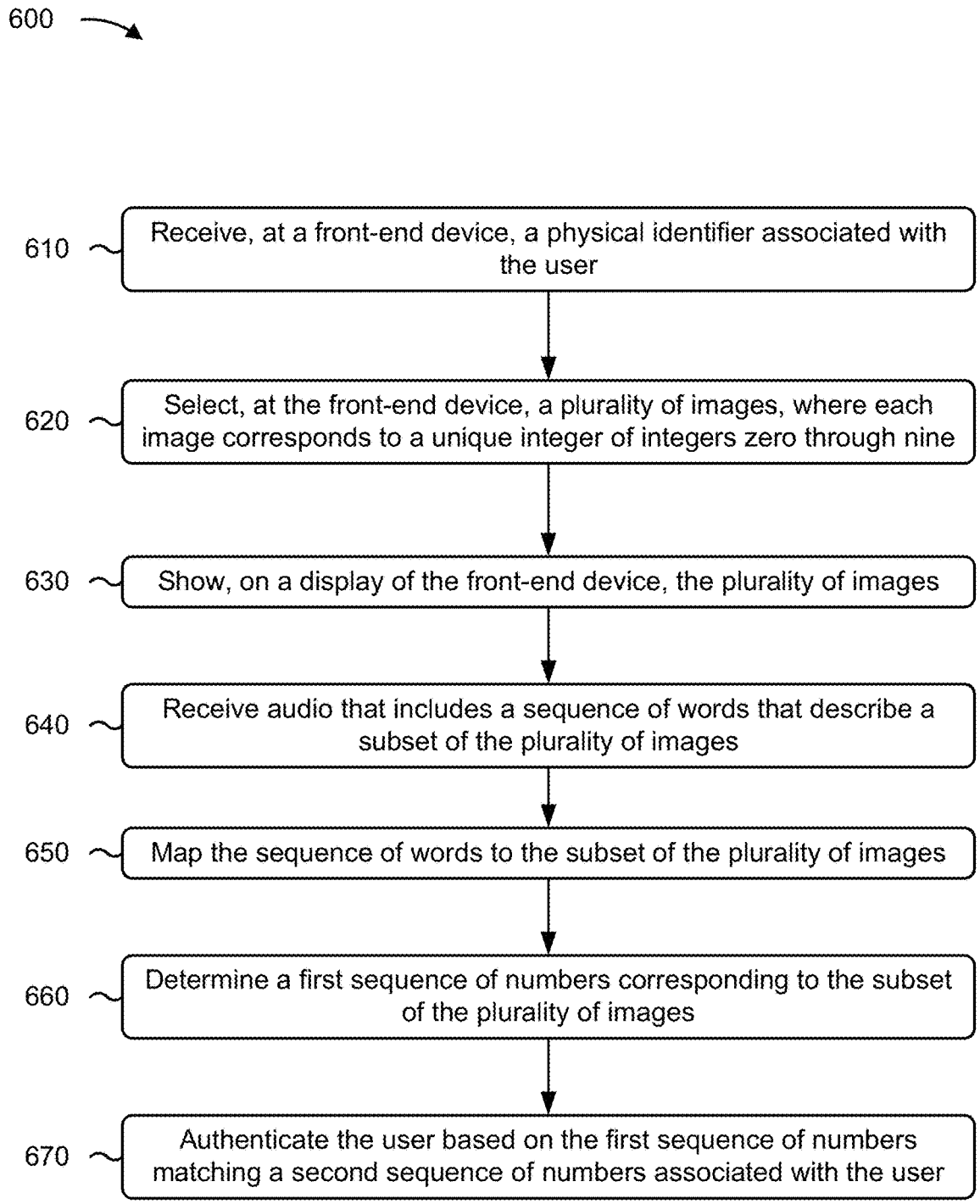
FIG. 6 is a flowchart of an example process relating to authenticating a user by speech.

FIG. 6 is a flowchart of an example process 600 associated with authentication by speech at a machine. In some implementations, one or more process blocks of FIG. 6 may be performed by a device (e.g., front-end device 410). In some implementations, one or more process blocks of FIG. 6 may be performed by another device or a group of devices separate from or including the device, such as user device 450 and/or remote server 470. Additionally, or alternatively, one or more process blocks of FIG. 6 may be performed by one or more components of device 500, such as processor 520, memory 530, input component 540, output component 550, and/or communication component 560.

As shown in FIG. 6, process 600 may include receiving, at a front-end device, a physical identifier associated with the user (block 610). For example, the front-end device may include a PoS terminal, a payment terminal (e.g., a credit card terminal, a contactless payment terminal, a mobile credit card reader, or a chip reader), and/or an ATM.

As further shown in FIG. 6, process 600 may include selecting, at the front-end device, a plurality of images, where each image corresponds to a unique integer of integers zero through nine (block 620). In some implementations, the plurality of images may be selected randomly (e.g., pseudo-randomly). In one example, the front-end device may store a set of images and may randomly select from a first subset of the set of images associated with integer zero, randomly select from a second subset of the set of images associated with integer one, and so on. In another example, the front-end device may randomly select ten images from the set of images.

As further shown in FIG. 6, process 600 may include showing, on a display of the front-end device, the plurality of images (block 630). The plurality of images may be shown in association with the corresponding integers or may be shown randomly (e.g., pseudo-randomly).

As further shown in FIG. 6, process 600 may include receiving audio that includes a sequence of words that describe a subset of the plurality of images (block 640). For example, the front-end device may instruct a microphone to begin recording after the display shows the plurality of images. The microphone may stop recording a preconfigured amount of time after the display shows the plurality of images and/or may stop recording after detecting a stop word or phrase spoken by the user. Accordingly, the microphone may include an ASIC and/or another type of integrated circuit that performs basic transcription of the recorded speech (e.g., in analog form or after conversion to digital audio) in order to detect the stop word or phrase. Additionally, or alternatively, the integrated circuit may apply one or more filters to the recorded speech (e.g., in analog form, after conversion to digital audio, or a combination thereof), such as removing background noise, normalizing volume, and/or applying a low-pass filter and/or a high-pass filter, among other examples.

As further shown in FIG. 6, process 600 may include mapping the sequence of words to the subset of the plurality of images (block 650). For example, the front-end device may decode the sequence of words using a speech-to-text algorithm (and, in some implementation, an identified language, as described herein) and map the sequence of words to the subset of the plurality of images.

As further shown in FIG. 6, process 600 may include determining a first sequence of numbers corresponding to the subset of the plurality of images (block 660). In some implementations, the first sequence of numbers may include a first hash of a sequence of numbers corresponding to the subset of the plurality of images.

As further shown in FIG. 6, process 600 may include authenticating the user based on the first sequence of numbers matching a second sequence of numbers associated with the user (block 670). For example, the front-end device may determine whether the second sequence of numbers matches the first sequence of numbers associated with the user. Alternatively, the front-end device may transmit the second sequence of numbers that corresponds to the subset of the plurality of images to a remote server and may receive an indication associated with comparing the sequences of numbers. In some implementations, the second sequence of numbers may include a second hash of a sequence of numbers associated with the user.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1C, 2A-2C, and/or 3A-3B.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for authenticating a user by speech, the system comprising:
   one or more memories; and
   one or more processors, communicatively coupled to the one or more memories, configured to:
      receive, at a front-end device, a physical identifier associated with the user;
      display, by the front-end device, a plurality of images corresponding to integers zero through nine, wherein each image, of the plurality of images, has a property that indicates a corresponding integer, of the integers zero through nine, for the image;
      receive audio that includes a sequence of words that describe a subset of the plurality of images to indicate a first sequence of numbers corresponding to a subset of the integers zero through nine;
      determine the first sequence of numbers based on the sequence of words; and
      authenticate the user based on the first sequence of numbers and a second sequence of numbers associated with the user.

2. The system of claim 1, wherein the first sequence of numbers is associated with a first hash of a sequence of numbers corresponding to the subset of the plurality of images, and wherein the second sequence of numbers is associated with a second hash of a sequence of numbers associated with the user.

3. The system of claim 1, wherein the one or more processors are further configured to:
   filter the audio to generate a filtered audio signal;
   identify a language associated with the audio;
   decode the sequence of words using a speech-to-text algorithm and the language; and
   map different portions of the sequence of words to different images in the subset of the plurality of images.

4. The system of claim 1, wherein the one or more processors, are further configured to:
   receive, for each image of the plurality of images, a plurality of words or phrases describing the image; and
   identify, for each image in the subset of the plurality of images, one of the plurality of words or phrases describing the image in the sequence of words.

5. The system of claim 1, wherein the one or more processors are further configured to:
   verify data associated with the physical identifier by contacting a remote server.

6. The system of claim 1, wherein the one or more processors are further configured to:
   modify the property of each image to indicate the corresponding integer for the image.

7. The system of claim 1, wherein the one or more processors are further configured to:
   display the plurality of images in a randomized order.

8. A method of authenticating a user by speech, comprising:
  receiving, at a front-end device, a physical identifier associated with the user;
  selecting, at the front-end device, a plurality of images, wherein each image, of the plurality of images, corresponds to a unique integer of integers zero through nine;
  showing, on a display of the front-end device, the plurality of images in association with the integers zero through nine;
  receiving audio that includes a sequence of words that describe a subset of the plurality of images to indicate a first sequence of numbers corresponding to a subset of the integers zero through nine;
  determining the first sequence of numbers based on the sequence of words; and
  authenticating the user based on the first sequence of numbers and a second sequence of numbers associated with the user.

9. The method of claim 8, further comprising:
  selecting a new plurality of images corresponding to new integers zero through nine based on the first sequence of numbers not matching the second sequence of numbers;
  showing, on the display of the front-end device, the new plurality of images in association with the new integers zero through nine;
  receiving new audio that includes a new sequence of words that describe a subset of the new plurality of images;
  mapping the new sequence of words to the subset of the new plurality of images;
  determining a third sequence of numbers corresponding to the subset of the new plurality of images; and
  authenticating the user based on the third sequence of numbers matching the second sequence of numbers.

10. The method of claim 8, wherein showing the plurality of images in association with the integers zero through nine comprises:
  showing the plurality of images organized in a pattern that indicates the integers zero through nine.

11. The method of claim 8, wherein showing the plurality of images in association with the integers zero through nine comprises:
  showing each image of the plurality of images adjacent to a corresponding integer for the image.

12. The method of claim 8, further comprising:
  receiving the first sequence of numbers from a remote server; or
  receiving the first sequence of numbers in connection with the physical identifier.

13. The method of claim 8, further comprising:
  contacting a remote server to perform an action based on authenticating the user.

14. A non-transitory computer-readable medium storing a set of instructions for authenticating a user by speech, the set of instructions comprising:
  one or more instructions that, when executed by one or more processors of a device, cause the device to:
    receive, from a user device, a request for an identifier associated with the user of the user device;
    indicate, to the user device, a sequence of objects based on a generated identifier associated with the user;
    receive, from a front-end device, a request to authenticate the user;
    indicate, to the front-end device, the sequence of objects based on the generated identifier; and
    receive, from the front-end device, a request to perform an action based on authenticating the user using:
      the sequence of objects, and
      audio that includes a sequence of words that describe a subset of the sequence of objects to indicate a sequence of numbers corresponding to the subset of the objects.

15. The non-transitory computer-readable medium of claim 14, wherein the one or more instructions, when executed by the one or more processors, further cause the device to:
  verify, before indicating the sequence of objects to the front-end device, that the generated identifier has not expired,
    wherein the generated identifier expires based on a time window associated with the generated identifier or based on a quantity of uses of the generated identifier.

16. The non-transitory computer-readable medium of claim 14, wherein the one or more instructions, when executed by the one or more processors, further cause the device to:
  receive a location associated with the front-end device; and
  verify, before indicating the sequence of objects to the front-end device, that the location satisfies a geographic threshold.

17. The non-transitory computer-readable medium of claim 14, wherein the one or more instructions, to receive the request for the identifier associated with the user, cause the device to:
  receive the request from the user device with at least one credential associated with the user; and
  verify the at least one credential before indicating the sequence of objects to the user device.

18. The non-transitory computer-readable medium of claim 14, wherein the one or more instructions, to indicate to the front-end device the sequence of objects, cause the device to:
  transmit, to the front-end device, identifiers associated with a subset of data structures, of a set of data structures, stored at the device and encoding images of the sequence of objects.

19. The non-transitory computer-readable medium of claim 14, wherein the one or more instructions, to receive the request to authenticate the user, cause the device to:
  receive the request from the front-end device with an account identifier associated with the user; and
  verify the account identifier before indicating the sequence of objects to the front-end device.

20. The non-transitory computer-readable medium of claim 19, wherein the one or more instructions, when executed by the one or more processors, further cause the device to:
  receive the sequence of objects to indicate to the front-end device based on the account identifier.

* * * * *